United States Patent [19]

Hashimoto et al.

[11] Patent Number: 5,788,482
[45] Date of Patent: Aug. 4, 1998

[54] SINTERING METHOD OF CEMENT CLINKERS AND SINTERING APPARATUS OF THE SAME

[75] Inventors: Isao Hashimoto, Akashi; Shozo Kanamori, Miki; Mikio Murao, Kobe; Norio Yokota, Tokyo; Nichitaka Sato, Tokyo; Katsuji Mukai, Tokyo, all of Japan

[73] Assignees: Kawasaki Jukogyo Kabushiki Kaisha, Kobe; Sumitomo Osaka Cement Co., Ltd., Tokyo, both of Japan

[21] Appl. No.: 822,717

[22] Filed: Mar. 25, 1997

Related U.S. Application Data

[63] Continuation-in-part of Ser. No. 637,765, filed as PCT/JP95/01748 Sep. 1, 1995, Pat. No. 5,690,730.

[30] Foreign Application Priority Data

Sep. 8, 1994 [JP] Japan .................................. 6-240686

[51] Int. Cl.[6] ............................................ F27B 15/00
[52] U.S. Cl. ................................... 432/106; 432/15
[58] Field of Search ......................... 432/15, 58, 106; 106/744, 750, 756

[56] References Cited

U.S. PATENT DOCUMENTS

| | | | |
|---|---|---|---|
| 3,932,117 | 1/1976 | Ritzmann | 432/106 |
| 4,270,900 | 6/1981 | Shy et al. | 432/106 |
| 4,877,397 | 10/1989 | Tatebayashi et al. | 432/106 |
| 5,478,234 | 12/1995 | Yakota et al. | |
| 5,536,167 | 7/1996 | Yokota et al. | 432/15 |
| 5,690,730 | 11/1997 | Hashimoto et al. | 432/106 |

FOREIGN PATENT DOCUMENTS

| | | |
|---|---|---|
| 58-115047 | 7/1983 | Japan . |
| 61-270243 | 11/1986 | Japan . |
| 2229745 | 9/1990 | Japan . |

*Primary Examiner*—Henry A. Bennett
*Assistant Examiner*—Gregory A. Wilson
*Attorney, Agent, or Firm*—Leydig, Voit & Mayer, Ltd.

[57] ABSTRACT

An apparatus for sintering a cement clinker in which preheated powdered raw materials are granulated and sintered in a single fluidized bed granulating and sintering furnace. The apparatus includes a first classifying station having a discharging grooved portion extending from the fluidized bed furnace to an opening in a radial direction and communicating with a gas distributor. The space above the discharging grooved portion diverges from the opening to a fluidized bed upstream of the gas distributor so that the total velocity of air blown through the opening and from nozzles in the discharging groove is constant. A second classifying station is in communication with the opening for blowing back small particles to the fluidized bed. In a third classifying station, a discharge chute is connected to a fluidized bed cooling unit for quenching granulated and sintered clinker while small particles are blown back to the granulating and sintering furnace.

13 Claims, 8 Drawing Sheets

5,788,482

SINTERING METHOD OF CEMENT CLINKERS AND SINTERING APPARATUS OF THE SAME

CROSS REFERENCE TO RELATED APPLICATION

This is a continuation-in-part of patent application Ser. No. 08/637,765, filed as PCT/JP95/01748 Sep. 1, 1995, now U.S. Pat. No. 5,690,730 the content of which is herein incorporated by reference.

BACKGROUND OF THE INVENTION

1. Field of the Invention

The present invention is directed to an improved method of sintering a cement clinker by the use of a single fluidized bed granulating and sintering furnace, and also to an improved sintering apparatus suited for use in carrying out such sintering method.

2. Description of the Related Art

Cement clinkers can be produced by generally preheating or partially calcinating a cement raw material powder previously blended with limestone, silica sand and so on and then crushed into grains, by granulating and sintering the resultant raw material powder, and thereafter by cooling the sinter in granular form. In recent years, a sintering apparatus comprised essentially of two different furnaces, namely a pair of a spouted bed granulating furnace and a fluidized bed sintering furnace, or a pair of a fluidized bed granulating furnace and a fluidized bed sintering furnace, has in most instances been used in producing cement clinkers. This type of apparatus is disclosed for instance in JP-A-2-229745, and the apparatus cited here is provided further with first and second cooling units.

Another sintering apparatus of a cement clinker has of late been known in which granulation and sintering are performed in one and the same fluidized bed furnace as disclosed for example in JP-A-58-115047.

In the sintering apparatus of the first-mentioned JP-A-2-229745 publication, a cement raw material powder is granulated in a spouted bed granulating furnace and then sintered in a fluidized bed sintering furnace, followed by quenching of the resultant granular sinter with use of a first cooling unit and by subsequent cooling of the same with use of a second cooling unit while the residual heat is recovered. Despite the advantages of possible sintering at elevated temperature due to use of the paired furnaces and hence production of a cement clinker with noticeably excellent quality, such prior art apparatus leaves the problem that it involves added machinery and equipment and increased running cost. In consequence, a keen demand has been voiced for the development of a sintering apparatus that is feasible with compacted machinery and equipment and with saved heat and power energies to a great extent.

As regards the sintering apparatus of the last-mentioned JP-A-58-115047 publication, air discharged out of a cooling unit is introduced into a discharge chute located to extend from the sintering furnace in such a manner that a plurality of classifying zones of different flow velocities of air are defined in the discharge chute. However, the flowing volume of air in each duct is determined depending upon the pressure differential exerted therein, and hence, tends to vary mainly with the conditions under which small particles are allowed to drop down through the discharge chute. This entails difficulty in controlling the velocity of air at a given level. Once the particles are dropped down in the discharge chute, they become less dispersible in the chute and thus fail to be adequately classified for being returned back to the fluidized bed.

For those reasons, the finished clinker is responsible for an adversely broad distribution of particle sizes and hence for a decline in quality. Small particles of the clinker are not sufficiently sinterable. Moreover, the clinker gets undesirably broadened in its particle size distribution even in the fluidized bed, eventually inviting an objectionable phenomenon wherein excessive particle-to-particle sticking takes place and leads to so-called agglomeration. This poses an obstacle in attaining a sufficiently high sintering temperature, or otherwise in obtaining a cement clinker with high quality.

SUMMARY OF THE INVENTION

In order to solve the problems experienced with the prior art and discussed above, the present invention has now been completed.

According to one aspect of the present invention, there is provided a method of sintering a cement clinker, which comprises the steps of:

preheating a cement raw material powder;

granulating and sintering the resulting raw material powder in a single fluidized bed granulating and sintering furnace;

in a discharging grooved portion extending from a fluidizing gas distributor of the fluidized bed granulating and sintering furnace to a clinker dropping hole disposed in a radial direction communicating with an upper surface of the gas distributor, first-classifying the resulting clinker by adjusting a velocity of air flowing in the discharging grooved portion such that the flow velocity of air is held substantially constant;

discharging the first-classified clinker from the granulating and sintering furnace through the clinker dropping hole;

in a discharge chute communicating with the clinker dropping hole, second-classifying the first-classified clinker with use of second-classifying air blown into a region adjacent to a lower portion of the discharge chute and also of cooling air blown up from below the discharge chute, thereby blowing small particles of the clinker back to a fluidized bed located upstream of the gas distributor;

in a fluidized bed portion communicating with the discharge chute and having a larger cross section than that of the latter, third-classifying the granulated and sintered clinker by quenching with use of cooling and fluidizing air blown into a region in close proximity to a lower part of the fluidized bed, thereby classifying small particles of the clinker and blowing the same back to the fluidized bed granulating and sintering furnace; and introducing the third-classified clinker into a cooling unit via hermetic discharge means.

It is preferred that the gas velocity in the first classifying step is the sum of air blowing out of the clinker dropping hole and air blowing out of a plurality of nozzles arranged in the discharging grooved portion.

In such sintering method, it is further preferred that in the third-classifying step, the clinker be quenched to 1,100° C. or below, preferably to 1,000° C. or below, and this mode of quenching produces a cement clinker of high quality. Also preferably, the velocity of air flowing right over the discharging grooved portion can be set to be higher than that of air flowing right over the gas distributor in the first-classifying step.

Besides and preferably, the clinker dropping hole may be adjusted in its area of opening such that the pressure differential is held substantially constant in a fluidized bed located upstream of the gas distributor.

According to another aspect of the present invention, there is provided an apparatus for sintering a cement clinker, which comprises:

- a preheater for preheating a cement raw material powder;
- a single fluidized bed granulating and sintering furnace for granulating and sintering the preheated raw material powder;
- a first-classifying station for classifying the resulting clinker wherein a discharging grooved portion is located to extend from a fluidizing gas distributor of the fluidized bed granulating and sintering furnace to a clinker dropping hole disposed in a radial direction communicating with an upper surface of the gas distributor, and the spacing defined above the discharging grooved portion is cross-sectionally diverged from the clinker dropping hole to a fluidized bed located upstream of the gas distributor such that the flow velocity of air which is the sum of air blown out of the clinker dropping hole and air blown out of a plurality of nozzles arranged in the discharging grooved portion is held substantially constant;
- a second-classifying station for classifying the first-classified clinker wherein piping means of blowing air for second classification is connected adjacent to a lower part of the discharge chute communicating with the clinker dropping hole, and small particles of the resulting clinker are blown back to the fluidized bed located upstream of the gas distributor with use of second-classifying air and also of cooling air blown up from below the discharge chute;
- a third-classifying station for classifying the second-classified clinker wherein the discharge chute is connected to a fluidized bed cooling unit having a larger cross section than that of the former, piping means for blowing cooling and fluidizing air is connected in proximity to a lower part of the fluidized bed cooling unit, and the resultant granulated and sintered clinker is quenched while small particles of the clinker are classified and blown back to the fluidized bed granulating and sintering furnace; and
- a cooling unit connected through hermetic discharge means to the third-classifying station.

In the sintering apparatus stated above, a gate portion can preferably be provided in the vicinity of the clinker dropping hole to thereby render adjustable the area of opening of the latter.

Also preferably, the discharging grooved portion can be held in downwardly inclined relation to the clinker dropping hole.

It is further preferred that in the first-classifying station, the aperture of each of the nozzles be adjustably variable so that the velocity of air flowing directly over the discharging grooved portion is higher than that of air flowing directly over the gas distributor.

Besides and preferably, a port portion for discharging large lumps may be defined in proximity to the clinker dropping hole so that the lumps are discharged prior to being dropped down in the discharge chute.

The cooling unit may be preferably constructed such that a moving bed is formed in a cooler body due to cooling air blown into the cooler body and that the area in cross section of an upper portion of the cooler body is selectively determined to form a partial fluidized bed on the moving bed. For example, a throttle or cross-sectional smaller-diameter portion may be provided upwardly of the cooler body so as to increase the flow velocity of air in the throttle portion, thereby forming a partial fluidized bed and preventing clinker particles against segregation.

A preheated cement raw material powder is charged into a fluidized bed of the fluidized bed granulating and sintering furnace where such raw material powder is subjected to granulation and sintering. The resultant granulated and sintered clinker is first-classified, directly over the discharging grooved portion and over the clinker dropping hole on an upper side portion of the gas distributor, by means of air blown out of the discharge chute. In such instance, small particles of the clinker are protected virtually from getting dropped into the discharge chute; that is, back mixing is made free. Those small particles having dropped in the discharge chute are efficiently second-classified and cooled by air blown thereinto.

The second-classified clinker is further subjected to third classification in the fluidized bed cooling unit of a large cross section, followed by quenching of the third-classified clinker. Thus, lowered temperature is ensured at the associated throat portion with no coating caused on a back surface of the gas distributor.

Further and advantageously, a narrow particle size distribution is attainable in the fluididized bed granulating and sintering furnace with the result that agglomeration can be avoided with high sintering temperature achieved.

BRIEF DESCRIPTION OF THE DRAWINGS

The present invention will be further described with reference to the accompanying drawings wherein like parts are identified by like reference numerals in the several views and wherein:

FIG. 3 diagrams the apparatus of the invention in a vertically systematic view, showing a fluidized bed granulating and sintering furnace, a suspension preheater, other related machinery and equipment and the like;

DESCRIPTION OF THE PREFERRED EMBODIMENTS

The present invention will now be described in regard to certain preferred embodiments which should be considered illustrative, but not restrictive. It is to be noted that various changes and modifications may be made to those embodiments within the scope contemplated under the invention.

Figure 1:
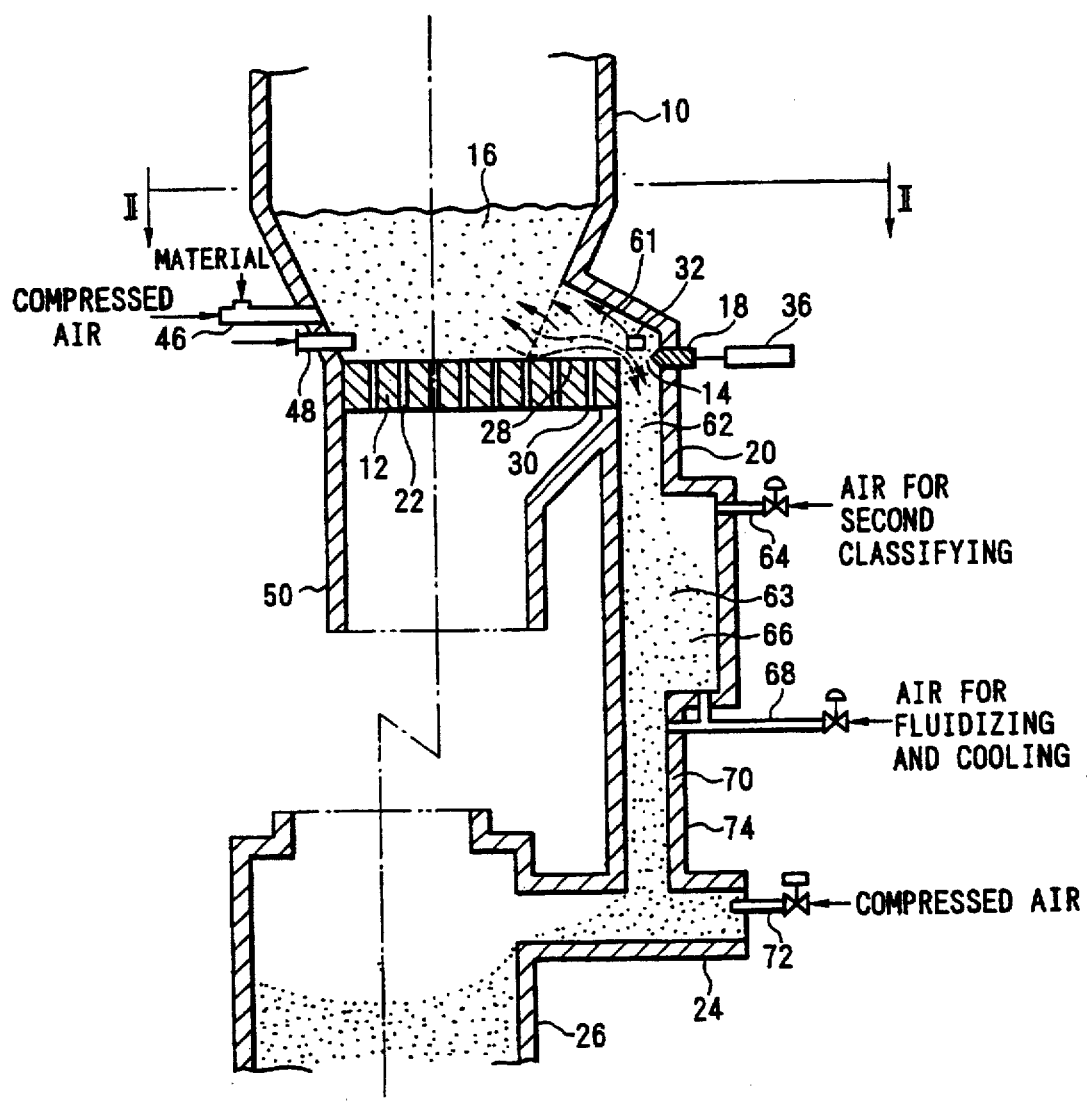
FIG. 1 is a vertical cross section illustrating one preferred embodiment of the sintering apparatus of a cement clinker provided in accordance with the present invention.
Figure 2:
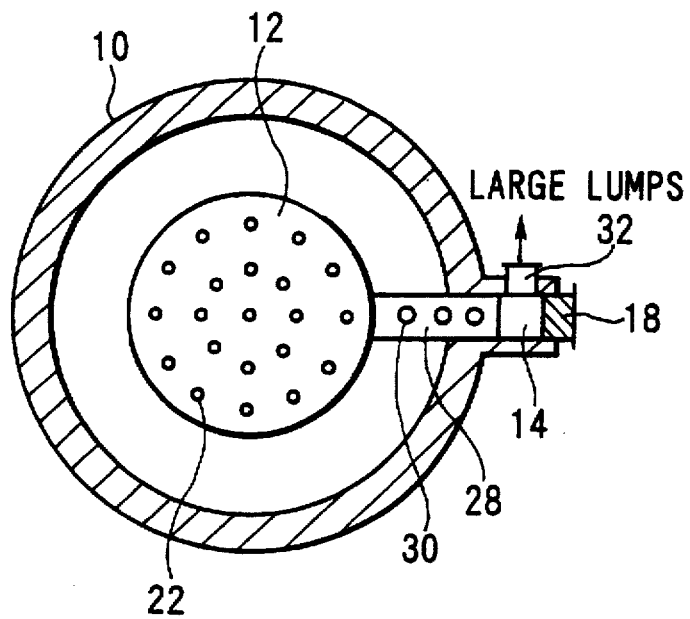
FIG. 2 is a cross section taken along the line II—II of FIG. 1, but with a fluidized bed omitted.
Figure 3:
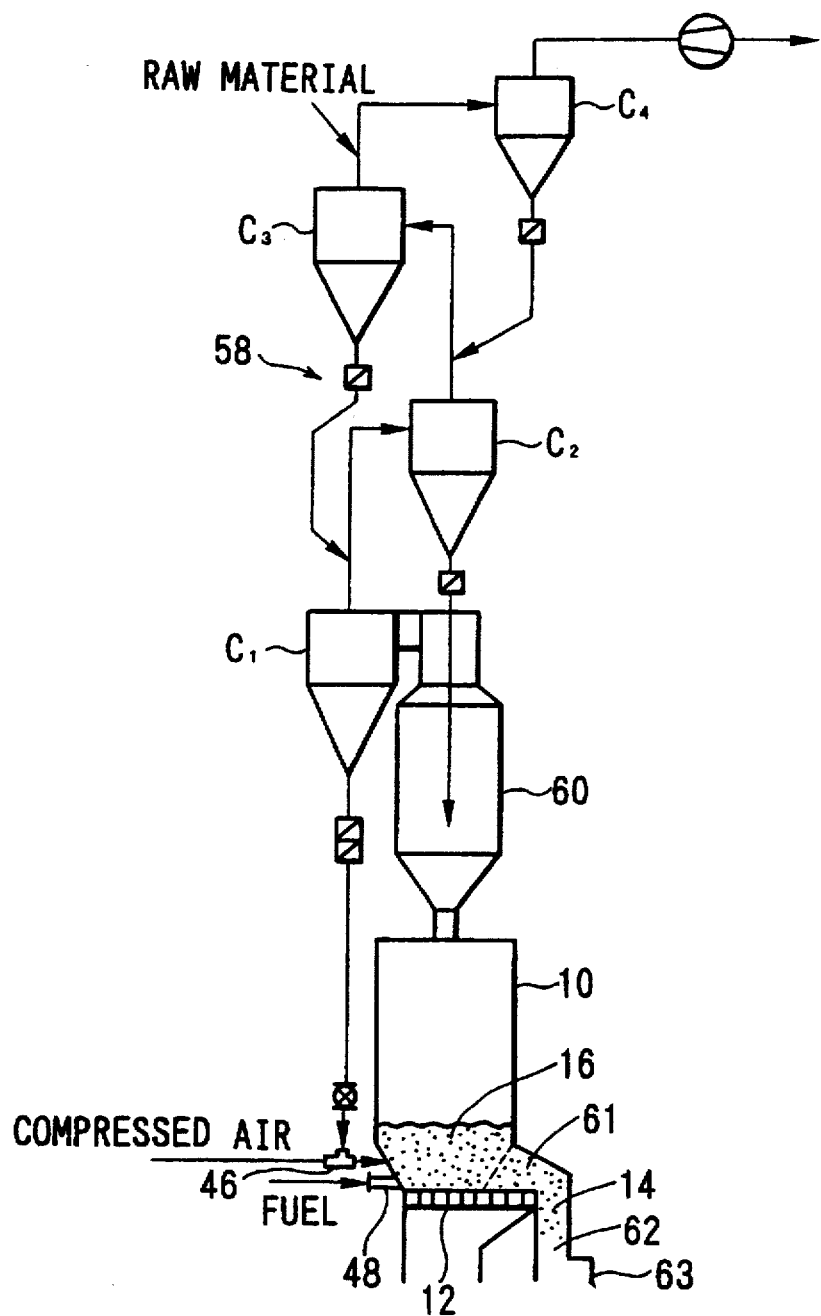

In FIG. 1, the first embodiment of the apparatus for sintering a cement clinker is illustrated which is constructed in accordance with the invention. FIG. 2 is a cross section taken along the II—II line of FIG. 1, but with a fluidized bed omitted. In FIG. 3, there are shown a fluidized bed granulating and sintering furnace, and related machinery and equipment positioned upstream thereof.

With further reference to FIG. 3, a suspension preheater is designated at 58 in which cyclones $C_1$ to $C_4$ are included, and a calcinating furnace is designated at 60 and a fluidized bed granulating and sintering furnace at 10. The calcinating furnace 60 may be employed only where found desirable. Some cases do not require for such furnace to be used.

A cement raw material powder is preheated in the suspension preheater 58 and calcinated partially in the calcinating furnace 60. Subsequently, the resulting raw material powder is placed in a fluidized bed 16 of the fluidized bed granulating and sintering furnace 10 where such powder is granulated and sintered while being fluidized in a stream of air transported through a throat portion and a fluidizing gas distributor 12 from a cooling unit positioned downward of the apparatus. Denoted at 46 is an ejector.

As better seen in FIGS. 1 and 2, a clinker dropping hole 14 is disposed in a radial direction extending from the gas distributor 12 of the fluidized bed granulating and sintering furnace 10 with a discharging grooved portion 28 located between the gas distributor 12 and the clinker dropping hole 14. The discharging grooved portion 28 includes a plurality of nozzles or openings 30. The spacing defined above the discharging grooved portion 28 is cross-sectionally diverged from the clinker dropping hole 14 to the fluidized bed 16 located upstream of the gas distributor 12 such that the flow velocity of air which is the sum of air blowing out of the clinker dropping hole 14 and air blowing out of the nozzles 30 arranged in the discharging grooved portion 28 is held substantially constant. Such construction constitutes the first-classifying station 61.

The second-classifying station 62 is so constituted that piping means 64 of blowing air for the second classification is connected adjacent to a lower part of the discharge chute 20 communicating with the clinker dropping hole 14, and small particles of the resulting clinker are blown back to the fluidized bed 16 located upstream of the gas distributor 12 with use of second-classifying air blown through the piping means 64 and also of cooling air blown up from below the discharge chute 20. Details of that cooling air will be described later.

The third-classifying station 63 is so constituted that the discharge chute 20 is coupled with a fluidized bed cooling unit 66 having a larger cross section than that of the former, which cooling unit 66 is connected in the vicinity of a lower part thereof to piping means 68 of blowing cooling and fluidizing air, and the resultant sintered clinker in granulated form is quenched while small particles of the clinker are classified and blown back to the fluidized bed 16 of the fluidized bed granulating and sintering furnace 10.

A cooling unit 26 is connected to the third-classifying station 63 via a filling layer portion 70 and hermetic discharge means 24 such as for example a L-shaped valve. The hermetic discharge means 24 is designed to permit temporary accommodation of the granular material in the third-classifying station and to intercept ventilation owing to the material sealing capability of the granular material per se, thereby ejecting and discharging the granular material into the cooling unit 26 through compressed air or mechanical means. Denoted at 72 is a supply conduit for compressed air.

A gate portion 18 is disposed in close proximity to the clinker dropping hole 14, which gate portion 18 renders adjustable the area of opening of the latter. Driving means denoted at 36 enables the gate portion 18 to be horizontally movable as by a hydraulic cylinder, a pneumatic cylinder, a motor cylinder or the like. Also defined adjacent to the clinker dropping hole 14 is a port portion 32 for use in discharging large lumps such as peeled coatings. Reference numeral 22 refers to a plurality of nozzles arranged in the gas distributor 12, 48 to a burner, and 50 to a throat portion.

Figure 4:
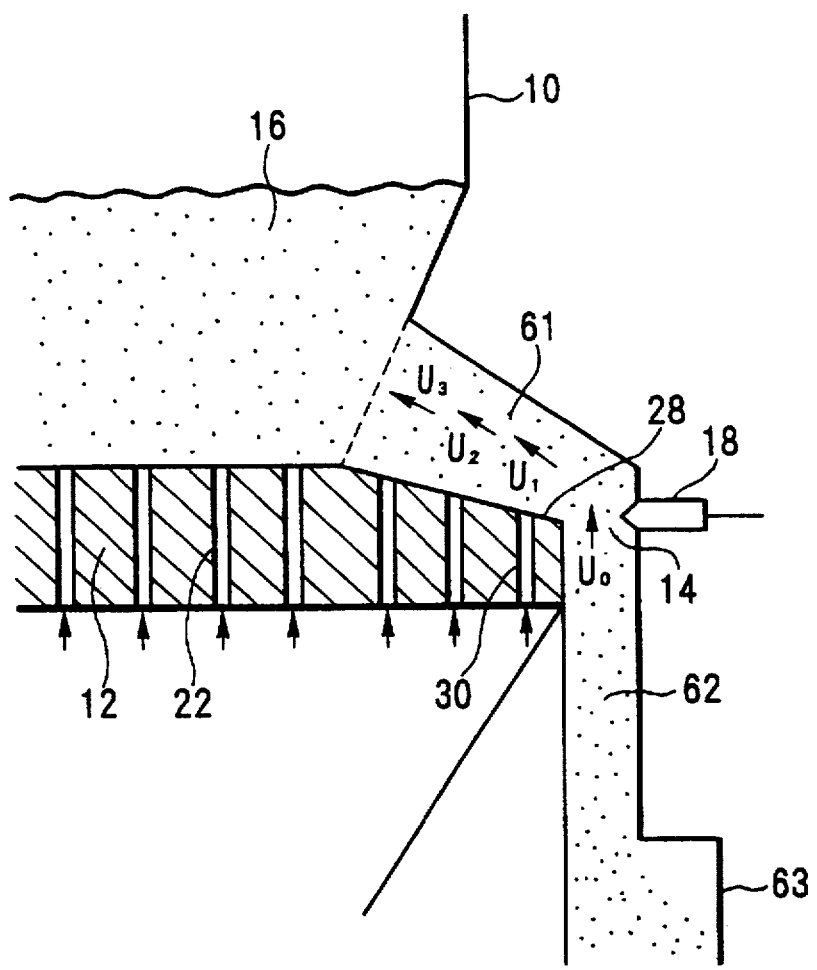
FIG. 4 is a cross section, partly enlarged, of a first-classifying station and related surroundings in the apparatus of the invention.

FIG. 4 shows an enlarged cross section of the first-classifying station 61 and its surrounding conditions. The station 61 is positioned above the discharging grooved portion 28, and the cross section of the station 61 defined in a direction rectangular to the flow of gas is converged toward the clinker dropping hole 14 in such a posture that the flow velocities $U_0$, $U_1$, $U_2$ and $U_3$ at various given regions are made virtually equal; that is, the equation of $U_0 \approx U_1 \approx U_2 \approx U_3$ is satisfied. This specified geometry contributes greatly to improved classification efficiency.

Furthermore, the discharging grooved portion 28 should be inclined on its bottom surface at an angle from 5 to 30 degrees with respect to the horizontal axis, preferably of 10 to 15 degrees, in order to achieve convenient discharging of large lumps. Below 10 degrees sometimes fails to smoothly discharge large lumps. Conversely, above 15 degrees invites small particles discharged in an excessive amount, involving poor classification efficiency.

The apertures of the nozzles 33 of the discharging grooved portion 28 can be varied to ensure that the velocity of air flowing directly over the discharging grooved portion 28 be rendered higher than that of air flowing directly over the gas distributor 12. This may be effected with increased diameters of the nozzles of the discharging grooved portion 28, increased numbers of the nozzles, or reduced pitches between the nozzles.

Figure 5:
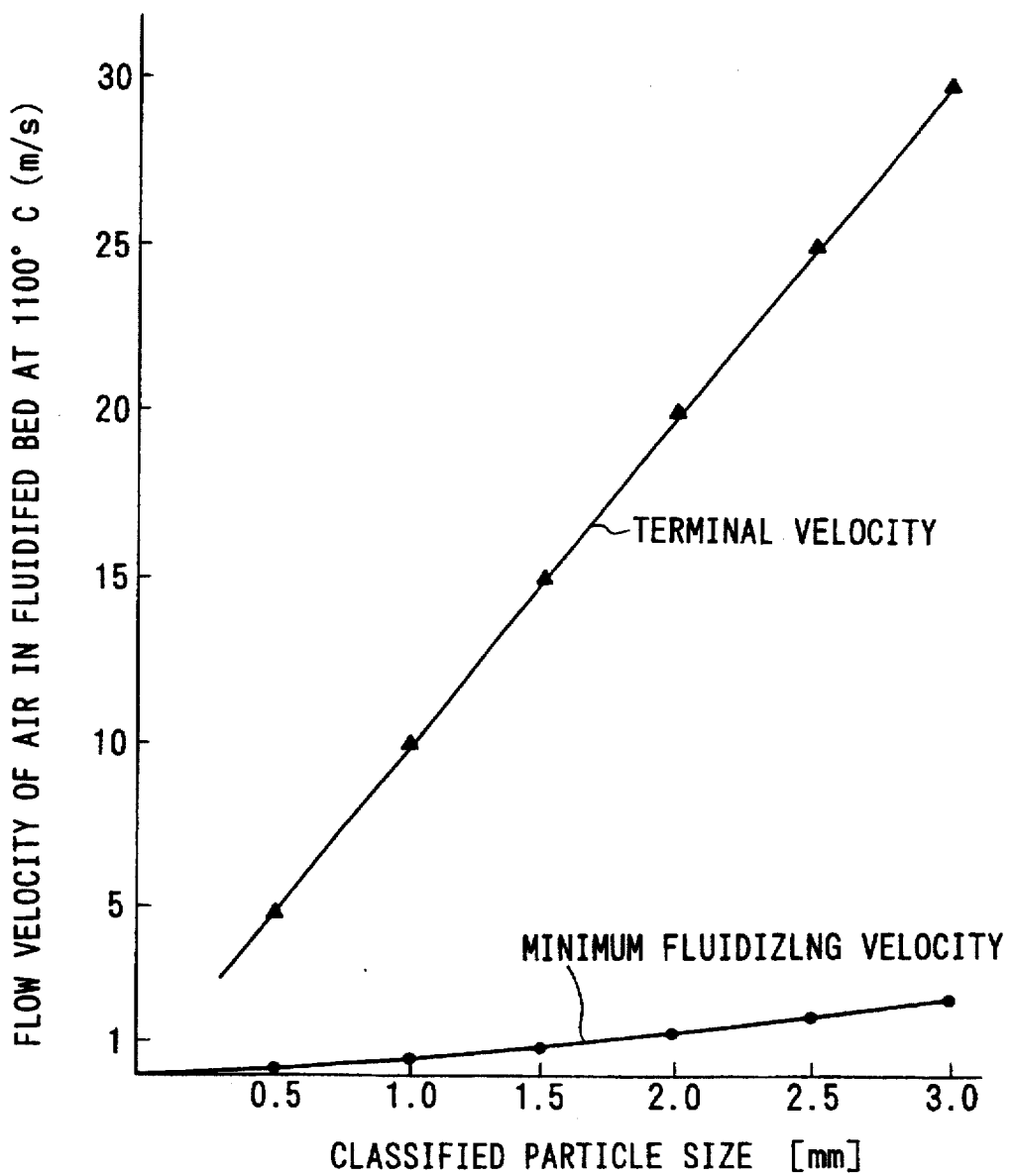
FIG. 5 graphically represents the relationship between the particle size of classified clinker, the minimum fluidizing velocity ($U_{mf}$) at 1,100° C. and the terminal velocity ($U_t$)

The particle size of classified clinker, the minimum fluidizing velocity ($U_{mf}$) at 1,100° C. and the terminal velocity ($U_t$) are correlative to each other as will be apparent from Table 1 below. The tabulated results when graphically represented are seen in FIG. 5. In view of Table 1 and FIG. 5, the flow velocity ($U_0$) of the clinker dropping hole 14 is set to be slightly greater than the terminal velocity ($U_t$) of the targeted classified particle size (for example, 0.5 to 1.0 mm) and besides to be beyond twice or thrice the minimum fluidizing velocity ($U_{mf}$)of particles to be discharged (for example, 2 to 3 mm in average particle size).

TABLE 1

| Classified particle size (mm) | 0.5 | 1.0 | 1.5 | 2.0 | 2.5 | 3.0 |
|---|---|---|---|---|---|---|
| minimum fluidizing velocity $U_{mf}$ (m/s) | 0.12 | 0.34 | 0.72 | 1.17 | 1.63 | 2.06 |
| terminal velocity $U_t$ (m/s) | 4.9 | 9.9 | 14.8 | 19.8 | 24.7 | 29.6 |

The second-classifying station 62 includes the discharge chute 20 that has a length sufficient enough to enable classification. In this station, cooling air is used in a volume twice to thrice (details below in connection with the third-classifying station) the volume of cooling air needed in a conventional system disclosed in U.S. Pat. No. 5,536,167. Thus, the concentration (kg of clinker/Nm³ of air) in the second-classifying station 62 amounts to ½ to ⅓ which further adds the volume of second-classifying air. This is taken to mean that classification efficiency is greatly improved in the second-classifying station 62. Lowered concentration shows a rise in classification efficiency.

The third-classifying station 63 is comprised of the fluidized bed cooling unit 68 which subjects a clinker granulated and sintered at 1,300° to 1,350° C. to quenching at a temperature of at least 1,100° C. or lower, preferably of lower than 1,000° C. Quenching gives rise to improved quality. To meet these requirements, appropriate choices should be made to the volume of cooling air and also to the dimension of a fluidized bed used. For example, when a clinker of a production scale of 5 t/h is cooled down to 1,000 to 1,100° C. from 1,350° C., the volume of cooling air required is determined to be in the order of 1,300 to 900 Nm3 from the associated heat balance.

In the case where the cooling time (retention time) is set to be from 2 to 4 min as concerns a clinker of 2 to 3 mm in particle size and where the flow velocity of air is set to be from 3 to 5 m/s in the third-classifying station, the fluidized bed cooling unit 68 should be dimensioned to be a square of about 650 mm with a fluidized bed height of about 500 mm.

Such design requirements ensure that clinkers be quenched with reliability and that cooling air be spent in a volume twice to thrice (in terms of a volume required for cooling to be done to 1,200° C.) the volume of cooling air used in the conventional system of U.S. Pat. No. 5,536,167. As a result, the concentration (kg of clinker/Nm³ of air) in the third-classifying station 63 can be reduced to ½ to ⅓. In addition, the fluidized bed of the station 63 is provided with known capabilities of classification with the result that small particles having a particle size smaller than 0.5 to 1.0 mm can be returned back to the fluidized bed granulating and sintering furnace 10.

Figure 6:
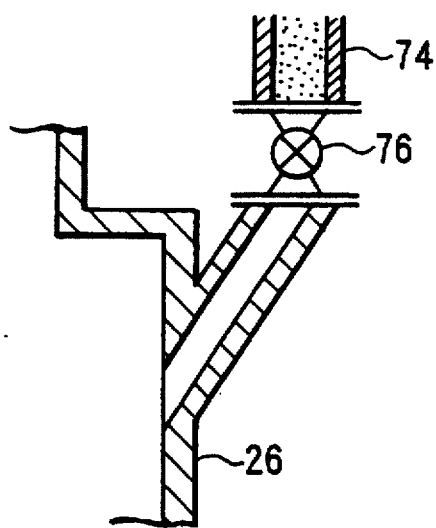
FIG. 6 is a cross section illustrating a modification of the hermetic discharge means mounted on the apparatus of FIG. 1.

In the embodiment illustrated in FIG. 1, an L-shaped valve is employed as the hermetic discharge means 24. In place of this valve, a rotary valve 76 for example may be disposed below a bottom of a discharge chute 74 connected to the filling layer portion 70 as shown in FIG. 6. The rotary valve 76 makes the amount of discharge adjustable and hence enables a granular material to be accommodated in a given amount in the discharge chute 74, eventually introducing the same into the cooling unit 26.

Figure 7:
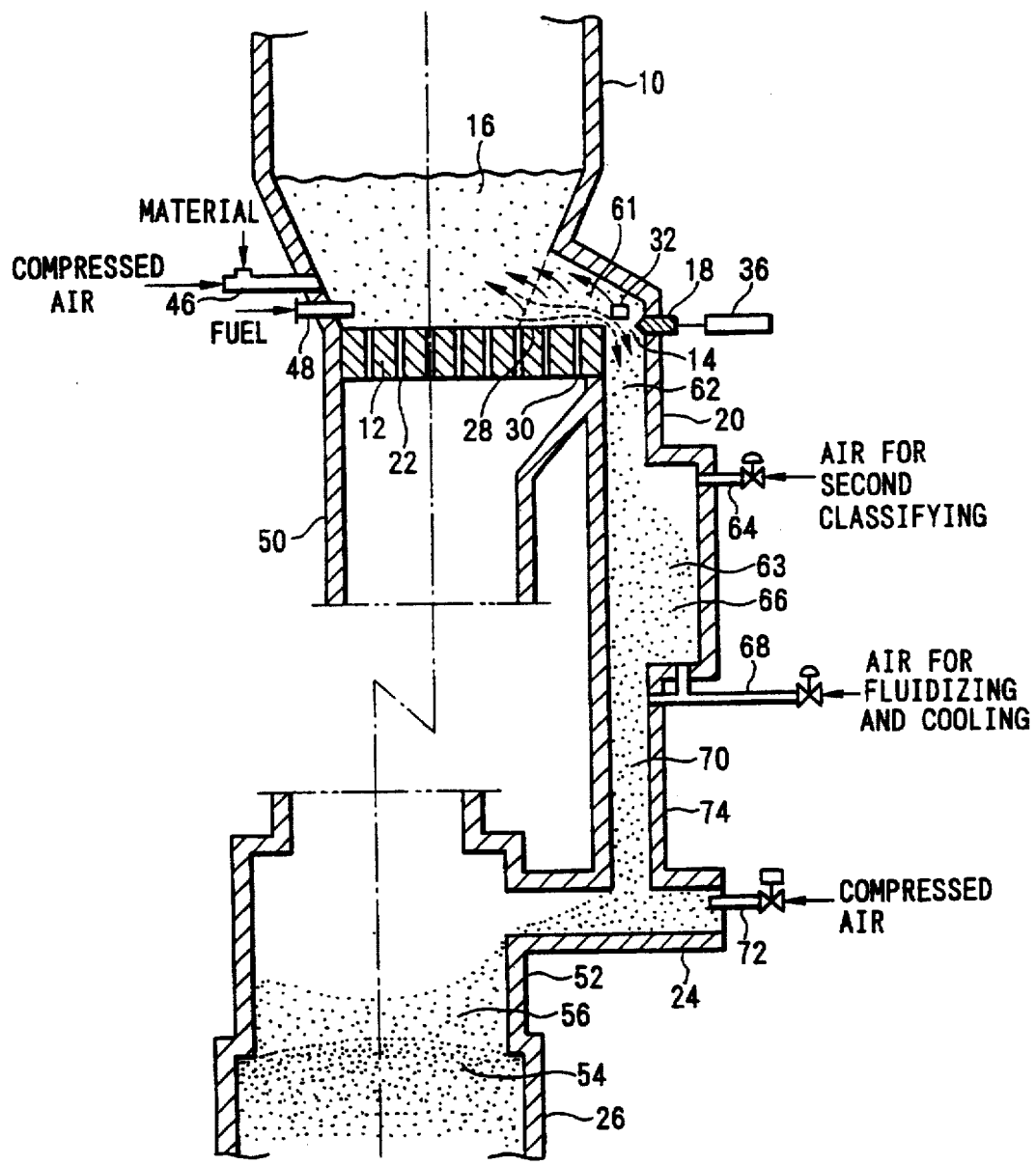
FIG. 7 is a vertical cross section illustrating another preferred embodiment of the sintering apparatus according to the invention.
Figure 8:
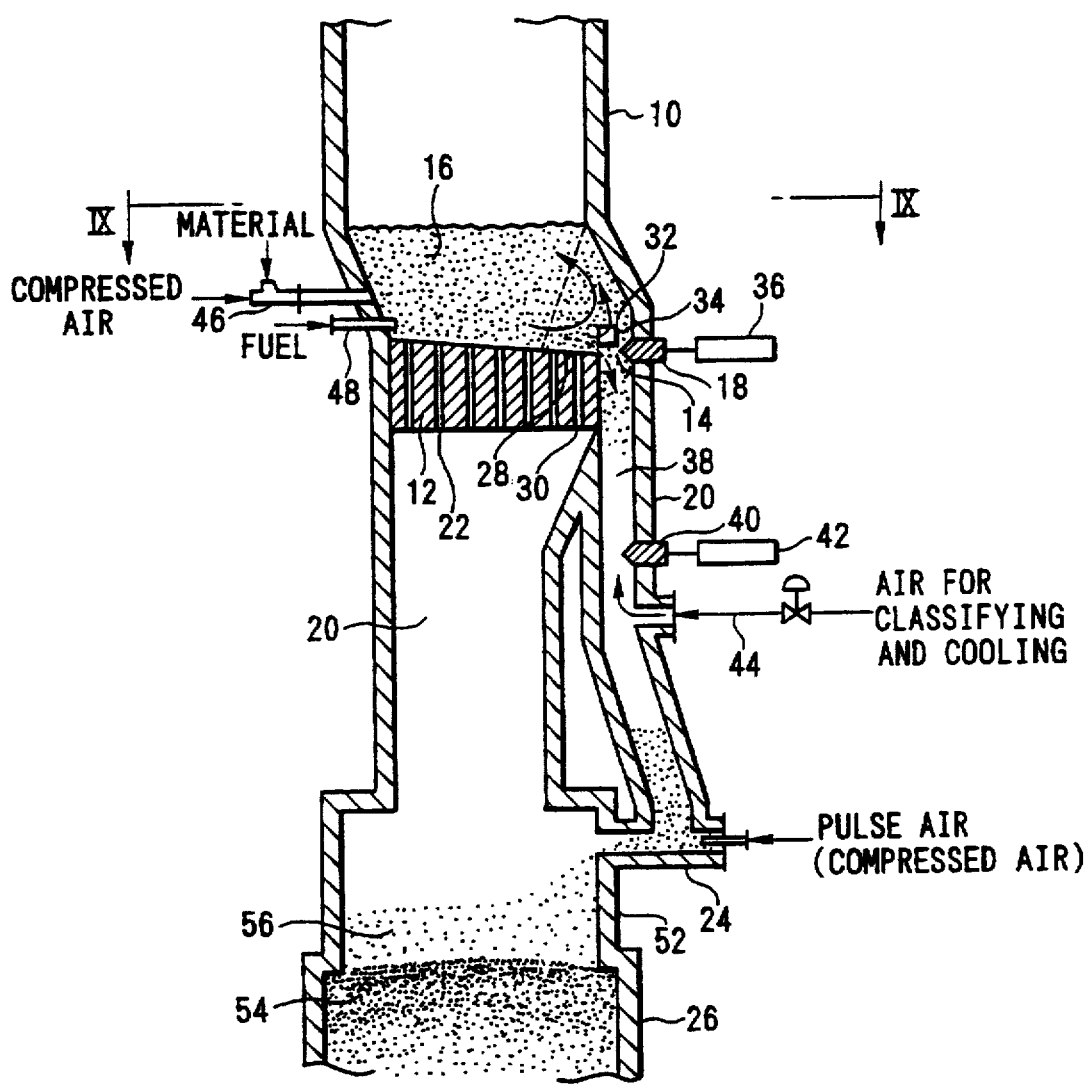
FIG. 8 is a vertical cross section showing a cement clinker-sintering apparatus of the prior art.
Figure 9:
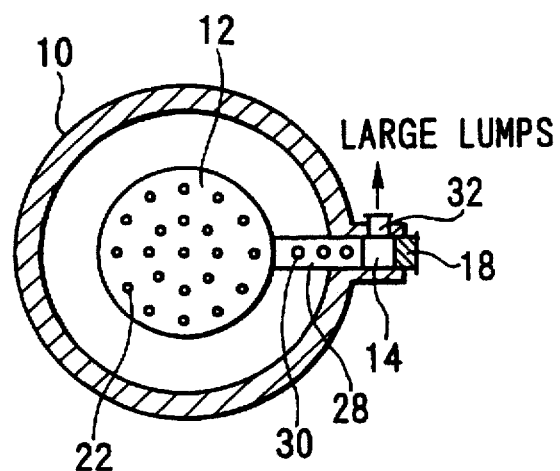
FIG. 9 is a cross section taken along the line IX—IX of FIG. 8, but with a fluidized bed omitted.

FIG. 7 illustrates another preferred embodiment of the cement clinker-sintering apparatus according to the present invention.

In that embodiment, the cooling unit 26 has a moving bed 54 in a cooler body thereof, which moving bed 54 has been formed due to cooling air blown into such body. The area in cross section of an upper portion of the cooler body is selectively determined such that a partial fluidized bed 56 is formed on the moving bed 54. As seen in FIG. 7 solely by way of example, a cross-sectional smaller-diameter portion 52 is provided upwardly of the cooler body, while the air heated and expanded by the clinker having formed the moving bed 54 is increased in its flow velocity at the smaller-diameter portion 52 so that the partial fluidized bed 56 is formed. Advantageously, this specific structure permits formation of the partial fluidized bed 56 on the moving bed 54, causing the clinker to get fluidized with least segregation and also reducing eccentric flow of air.

With the present invention constructed as shown and described hereinabove, the following advantages can be achieved.

(1) Because the flow velocity of gas is set to be constant in the spacing (first-classifying station) defined above the discharging grooved portion, classification performance can be improved in the first-classifying station. Moreover, when the velocity of gas flowing right over the discharging grooved portion is made greater (for example, twice or more) than that of gas flowing right over the gas distributor, classification performance in the first-classifying station can be improved to a noticeably great degree.

(2) Due to lower concentrations of the second-classifying station than in the conventional system (for example, ½ or lower, namely 5 kg of clinker/Nm³ of air or lower), improved classification performance is attainable.

(3) By use of a fluidized bed cooling unit having a large cross section and located below the discharge chute communicating with the clinker dropping hole, the clinker can be reliably quenched to from 1,000° to 1,100° C. so that a cement clinker product of high quality is obtainable.

(4) Owing to complete classification of the clinker through the first to third classifications and eventual freedom from small particles to be discharged, a cement clinker can be produced with high quality.

(5) When the discharging grooved portion is inclined downwardly toward the clinker dropping hole, smoothed discharging of large lumps is gained with further improved efficiency of classification.

(6) When the area in cross section in an upper portion of the fluidized bed cooling unit is so selectively determined that fluidization occurs over a moving bed, heat consumption is further reduced with acceptable down-sizing as to a cooling unit used.

(7) Even in the case of scaling up of the apparatus, the performance of classification is held with almost no or minimal decline. Thus, scaling up is easy to perform.

What is claimed is:

1. A method of sintering a cement clinker, which comprises the steps of:

preheating a cement raw material powder;

granulating and sintering the resulting raw material powder in a single fluidized bed granulating and sintering furnace;

in a discharging grooved portion extending from a fluidizing gas distributor of the fluidized bed granulating and sintering furnace to a clinker dropping hole disposed in a radial direction communicating with an upper surface of the gas distributor, first-classifying the resulting clinker by adjusting a velocity of gas flowing in the discharging grooved portion such that the flow velocity of the gas is held substantially constant;

discharging the first-classified clinker from the granulating and sintering furnace through the clinker dropping hole;

in a discharge chute communicating with the clinker dropping hole, second-classifying the first-classified clinker with use of second-classifying air blown into a region adjacent to a lower portion of the discharge chute and also of cooling air blown up from below the discharge chute, thereby blowing small particles of the clinker back to a fluidized bed located upstream of the gas distributor;

in a fluidized bed portion communicating with the discharge chute and having a larger cross section than that of the latter, third-classifying the granulated and sintered clinker by quenching with use of cooling and fluidizing air blown into a region in close proximity to a lower part of the fluidized bed, thereby classifying small particles of the clinker and blowing the same back to the fluidized bed granulating and sintering furnace; and introducing the third-classified clinker into a cooling unit via hermetic discharge means.

2. The method according to claim 1, wherein said gas in the first classifying step is the sum of the gas blowing out of the clinker dropping hole and the air blowing out of a plurality of nozzles arranged in the discharging grooved portion.

3. The method according to claim 1 or 2, wherein in the third-classifying step, the clinker is quenched to a temperature of 1,100° C. or lower.

4. The method according to any one of claims 1 to 3, wherein in the first-classifying step, the velocity of air flowing directly over the discharging grooved portion is higher than that of air flowing directly over the gas distributor.

5. The method according to any one of claims 1 to 4, wherein the clinker dropping hole is adjusted in its area of opening such that the pressure differential is held substantially constant in the fluidized bed located upstream of the gas distributor.

6. An apparatus for sintering a cement clinker, which comprises;

a preheater for preheating a cement raw material powder;

a single fluidized bed granulating and sintering furnace for granulating and sintering the preheated raw material powder;

a first-classifying station for classifying the resulting clinker wherein a discharging grooved portion is located to extend from a fluidizing gas distributor of the fluidized bed granulating and sintering furnace to a clinker dropping hole disposed in a radial direction communicating with an upper surface of the gas distributor, and the spacing defined above the discharging grooved portion is cross-sectionally diverged from the clinker dropping hole to a fluidized bed located upstream of the gas distributor such that the flow velocity of air which is the sum of air blown out of the clinker dropping hole and air blown out of a plurality of nozzles arranged in the discharging grooved portion is held substantially constant;

a second-classifying station for classifying the first-classified clinker wherein piping means of blowing air for second classification is connected adjacent to a lower part of a discharge chute communicating with the clinker dropping hole, and small particles of the resulting clinker are blown back to the fluidized bed located upstream of the gas distributor with use of second-classifying air and also of cooling air blown up from below the discharge chute;

a third-classifying station for classifying the second-classified clinker wherein the discharge chute is connected to a fluidized bed cooling unit having a larger cross section than that of the former, piping means for blowing cooling and fluidizing air is connected in proximity to a lower part of the fluidized bed cooling unit, and the resultant granulated and sintered clinker is cuenched while small particles of the clinker are classified and blown back to the fluidized bed granulating and sintering furnace; and a cooling unit connected through hermetic discharge means to the third-classifying station.

7. The apparatus according to claim 6, which further includes a gate portion disposed in the vicinity of the clinker dropping hole to thereby render adjustable the area of opening of the latter.

8. The apparatus according to claim 6 or 7, wherein the discharging grooved portion is held in downwardly inclined relation to the clinker dropping hole.

9. The apparatus according to any one of claims 6 to 8, wherein the aperture of each of the nozzles provided in the discharging grooved portion is variable such that the velocity of air flowing right over the discharging grooved portion is higher than that of air flowing right over the gas distributor in the first-classifying station.

10. The apparatus according to any one of claims 6 to 9, which further includes a port portion disposed adjacent to the clinker dropping hole so as to discharge large lumps therethrough.

11. The apparatus according to any one of claims 6 to 10, wherein the fluidized bed cooling unit has a moving bed in a cooler body thereof, which moving bed has been formed due to cooling air blown into the cooler body, and the area in cross section of an upper portion of the cooler body is selectively determined such that a partial fluidized bed is is formed on the moving bed.

12. The apparatus according to claim 11, wherein the cooler body has a cross-sectional smaller-diameter portion provided upwardly thereof.

13. A method of sintering cement clinkers comprising the steps of:

a) preheating raw cement powder material;

b) granulating and sintering said preheated raw cement powder material in a combined fluidized bed granulating and sintering furnace to form granulated and sintered clinkers;

c) classifying said clinkers above a clinker dropping hole and on a discharging grooved portion, said clinker dropping hole being provided in a radial direction extending from an upper surface of a fluidizing gas distributor of the granulating and sintering furnace through the discharging grooved portion, said grooved portion having a plurality of nozzles and being formed between the gas distributor and the clinker dropping hole;

d) discharging classified clinkers from the fluidized bed granulating and sintering furnace through said clinker dropping hole;

e) further classifying and cooling the clinkers by blowing air into a discharge chute connected to the clinker dropping hole while regulating the amount of the blown air in such a manner that granulated and sintered clinkers are quenched down to at least 1100° C., and wherein a flow velocity of the air blowing from the clinker dropping hole is different from a flow velocity of air flowing through the nozzles of the gas distributor; and f) introducing the clinkers into a cooling device via hermetic discharge means provided below a classifying and cooling air intake position.

* * * * *

UNITED STATES PATENT AND TRADEMARK OFFICE
CERTIFICATE OF CORRECTION

PATENT NO. : 5,788,482
DATED : August 4, 1998
INVENTOR(S) : Hashimoto et al.

Page 1 of 2

It is certified that error appears in the above-identified patent and that said Letters Patent is hereby corrected as shown below:

Column 9, Line 12, delete "or 2";

Line 15, change "any one of claims 1 to 3" to --claim 1--;

Line 20, change "any one of claims 1 to 4" to --claim 1--;

Line 26, change ";" to --:--;

Column 10, Line 7, delete "or 7";

Line 10, change "any one of claims 6 to 8" to --claim 6--;

Line 16, change "any one of claims 6 to 9" to --claim 6--;

Line 20, change "any one of claims 6 to 10" to --claim 6--.

UNITED STATES PATENT AND TRADEMARK OFFICE
CERTIFICATE OF CORRECTION

PATENT NO. : 5,788,482
DATED : August 4, 1998
INVENTOR(S) : Hashimoto et al.

It is certified that error appears in the above-identified patent and that said Letters Patent is hereby corrected as shown below:

Line 16, change "any one of claims 6 to 9" to --claim 6--;

Line 20, change "any one of claims 6 to 10" to --claim 6--.

Signed and Sealed this

Twenty-ninth Day of December, 1998

*Attest:*

BRUCE LEHMAN

*Attesting Officer*     *Commissioner of Patents and Trademarks*